United States Patent [19]

Winnik et al.

[11] Patent Number: 5,541,633
[45] Date of Patent: Jul. 30, 1996

[54] INK JET PRINTING OF CONCEALED IMAGES ON CARBONLESS PAPER

[75] Inventors: Francoise M. Winnik, Toronto; Marcel P. Breton, Mississauga; David J. Sanders, Oakville, all of Canada

[73] Assignee: Xerox Corporation, Stamford, Conn.

[21] Appl. No.: 78,720

[22] Filed: Jun. 16, 1993

Related U.S. Application Data

[63] Continuation-in-part of Ser. No. 922,882, Jul. 31, 1992, Pat. No. 5,286,286, and a continuation-in-part of Ser. No. 834,093, Feb. 12, 1992, Pat. No. 5,271,764.

[51] Int. Cl.⁶ .......................... G01D 15/16; C09D 11/02
[52] U.S. Cl. .......................... 347/98; 347/105; 106/20 D; 106/21 R; 503/201
[58] Field of Search .................... 347/100, 103, 347/98, 105; 106/20 D, 21 R; 503/201

[56] References Cited

U.S. PATENT DOCUMENTS

| | | | |
|---|---|---|---|
| 4,143,381 | 3/1979 | Downie | 347/98 |
| 4,312,268 | 1/1982 | King | 101/1 |
| 4,996,184 | 2/1991 | Bevan et al. | 503/226 |
| 5,145,518 | 9/1992 | Winnik et al. | 106/20 D |
| 5,156,675 | 10/1992 | Breton et al. | 106/20 D |
| 5,174,556 | 12/1992 | Taylor et al. | 270/1.1 |

FOREIGN PATENT DOCUMENTS

| | | |
|---|---|---|
| 518490 | 12/1992 | European Pat. Off. . |
| 56-12036 | 9/1981 | Japan ............... 347/103 |
| 63-30374 | 12/1988 | Japan ............... 347/103 |

*Primary Examiner*—Benjamin R. Fuller
*Assistant Examiner*—Valerie Ann Lund
*Attorney, Agent, or Firm*—Judith L. Byorick

[57] ABSTRACT

Disclosed is a process which comprises (1) incorporating into a printing apparatus capable of generating ink jet images a carbonless paper set comprising a first sheet, a second sheet, and optional intermediate sheets situated between the first sheet and second sheet, wherein the first sheet comprises paper coated on one surface with a color former and the second sheet comprises paper coated on one surface with a color developer, and wherein, when the carbonless paper set is assembled, the surface of the first sheet coated with the color former is in contact with the surface of a sheet coated with the color developer and the surface of the second sheet coated with the color developer is in contact with the surface of a sheet coated with the color former; (2) incorporating into the printing apparatus an ink jet ink comprising (a) water; (b) a member selected from the group consisting of glycols, sulfolane, and mixtures thereof; (c) optionally, a member selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether; (e) optionally, dipropylene glycol monomethyl ether acetate; and (f) a marking material which is substantially colorless and detectable when exposed to radiation outside of the visible wavelength range; and (3) causing droplets of the ink to be ejected in an imagewise pattern onto at least one surface of at least one of the sheets of the carbonless paper set.

13 Claims, No Drawings

INK JET PRINTING OF CONCEALED IMAGES ON CARBONLESS PAPER

This application is a continuation-in-part of application U.S. Ser. No. 07/922,882, filed Jul. 31, 1992, U.S. Pat. No. 5,286,286, entitled "Colorless Fast-Drying Ink Compositions for Printing Concealed Images Detectable by Fluorescence", and application U.S. Ser. No. 07/834,093, filed Feb. 12, 1992, U.S. Pat. No. 5,271,764, entitled "Ink Compositions", the disclosures of each of which are totally incorporated herein by reference.

BACKGROUND OF THE INVENTION

The present invention is directed to processes for generating concealed images. More specifically, the present invention is directed to methods of placing concealed images on carbonless paper by ink jet printing processes. One embodiment of the present invention is directed to a process which comprises (1) incorporating into a printing apparatus capable of generating ink jet images a carbonless paper set comprising a first sheet, a second sheet, and optional intermediate sheets situated between the first sheet and second sheet, wherein the first sheet comprises paper coated on one surface with a color former and the second sheet comprises paper coated on one surface with a color developer, and wherein, when the carbonless paper set is assembled, the surface of the first sheet coated with the color former is in contact with the surface of a sheet coated with the color developer and the surface of the second sheet coated with the color developer is in contact with the surface of a sheet coated with the color former; (2) incorporating into the printing apparatus an ink jet ink comprising (a) water; (b) a member selected from the group consisting of glycols, sulfolane, and mixtures thereof; (c) optionally, a member selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether; (e) optionally, dipropylene glycol monomethyl ether acetate; and (f) a marking material which is substantially colorless and detectable when exposed to radiation outside of the visible wavelength range; and (3) causing droplets of the ink to be ejected in an imagewise pattern onto at least one surface of at least one of the sheets of the carbonless paper set.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Carbonless paper sets generally are stacks of at least two sheets of paper wherein the application of pressure in imagewise fashion on the top sheet, typically by handwriting or typing, results in formation of a corresponding image on the underlying sheets, so that copies are formed as the image is generated on the top sheet. Carbonless paper sets typically comprise a top sheet of paper, on the bottom surface of which is coated a first composition, and a bottom sheet, on the top surface of which is coated a second composition. The first and second compositions are in contact with each other when the top and bottom sheets are placed in stack formation, and generally are of a nature such that application of pressure to the top sheet of the stack at a specified location causes interaction between the first and second compositions that results in the formation of a colored area on the bottom sheet at the location at which pressure was applied. Intermediate sheets can be located between the top and bottom sheets, wherein each intermediate sheet is coated on its top surface with the second composition and on its bottom surface with the first composition; application of pressure to the top sheet then results in the formation of a colored area at the location at which pressure was applied on each of the intermediate sheets and on the bottom sheet.

An example of a carbonless paper set is disclosed in U.S. Pat. No. 3,843,383, the disclosure of which is totally incorporated herein by reference. This patent discloses a recording sheet comprising a support having thereon a layer of color developer capable of reacting with a substantially colorless color former to form colored images. The paper set generally comprises a top sheet coated with microcapsules containing a color former solution, a bottom sheet coated with a color developer material in a binder, and, in some instances, middle sheets coated on one side with the color developer and on the other side with the color former microcapsules. Alternatively, the color former microcapsules and the color developer can be applied to the same surface of a paper. The color developer comprises a clay into which is incorporated at least one aromatic carboxylic acid or alkali metal salt thereof, and, optionally, acidic resins or inorganic pigments such as metal oxides, metal hydroxides, or metal carbonates. Suitable clays include acidic clay, active clay, attapulgite, zeolite, bentonite, kaolin, silicic acid, synthetic silicic acid, aluminum silicate, zinc silicate, colloidal silicic acid, and the like. The clay and the aromatic carboxylic acid or alkali metal salt thereof are formed into a coating solution which is then applied to paper. The color former is dissolved in a solvent and encapsulated in microcapsules, or is dissolved in a solvent and mixed with a binder. Contacting a sheet coated with microcapsules containing the color former under pressure with a sheet coated with the color developer results in formation of a color image. Other patents disclosing carbonless paper of this type include U.S. Pat. No. 2,712,507 and U.S. Pat. No. 2,730,456, the disclosures of which are totally incorporated herein by reference. Alternatively, as disclosed in U.S. Pat. No. 2,730,457, the disclosure of which is totally incorporated herein by reference, the color former microcapsules and the color developer of a carbonless paper can be applied to the same surface of a paper sheet. Other configurations of color former, color developer, and a pressure-releasable liquid solvent are possible, including, for example, those disclosed in U.S. Pat. No. 3,672,935, the disclosure of which is totally incorporated herein by reference. Additional patents disclosing carbonless papers and materials suitable for carbonless paper applications include U.S. Pat. No. 2,417,897, U.S. Pat. No. 3,672,935, U.S. Pat. No. 3,681,390, U.S. Pat. No. 4,202,820, U.S. Pat. No. 4,675,706, U.S. Pat. No. 3,481,759, U.S. Pat. No. 4,334,015, U.S. Pat. No. 4,372,582, U.S. Pat. No. 4,334,015, U.S. Pat. No. 2,800,457, U.S. Pat. No. 2,800,458, U.S. Pat. No. 3,418,250, U.S. Pat. No. 3,516,941, U.S. Pat. No. 4,630,079, U.S. Pat. No. 3,244,550, U.S. Pat. No. 3,672,935, U.S. Pat. No. 3,732,120, U.S. Pat. No. 3,843,383, U.S. Pat. No. 3,934,070, U.S. Pat. No. 3,481,759, U.S. Pat. No. 3,809,668, U.S. Pat. No. 4,877,767, U.S. Pat. No. 4,857,406, U.S. Pat. No. 4,853,364, U.S. Pat. No. 4,842,981, U.S. Pat. No. 4,842,976, U.S. Pat. No. 4,788,125, U.S. Pat. No. 4,772,532, and U.S. Pat. No. 4,710,570, the disclosures of each of which are totally incorporated herein by reference.

Frequently carbonless paper sets are printed as forms, wherein a large number of sets are printed with standard text or other material, leaving blank areas for individualized information to be filled in by, for example, impact typewriting or handwriting. Typically, carbonless preprinted forms are generated by techniques such as offset printing. Offset printing and other large scale printing processes, however, require complex and expensive equipment which is not generally found in an office or small business environment. Thus, one desiring forms printed on carbonless paper generally must order them from a professional printer, thus generating added costs and inconvenience, particularly when only a relatively small number of the pre-printed forms are needed. The ability to generate pre-printed carbonless forms on standard office equipment thus can be desirable, particularly when small quantities of forms are desired.

In some instances, it may be desirable to print concealed images on carbonless forms, such as barcodes. Concealed images, for the purposes of the present invention, are images that are invisible to the human eye under normal viewing conditions, but readable by a sensor, such as an infrared-sensitive device or a fluorescence detector, or by the human eye when the images are exposed to radiation outside of the visible wavelength range, such as ultraviolet light or the like. For example, the pharmaceuticals industry uses large numbers of carbonless forms for clinical drug testing; after each test has been completed and each form filled in, the completed forms can be returned to the pharmaceutical company for collation and analysis of the data. Invisible images can be useful in this context to tag each copy for subsequent processing. Many other possible applications exist for concealed images on carbonless forms. The marking material employed to generate the concealed images, however, must be of a composition such that it does not adversely interact with the carbonless paper color former or color developer materials; such interaction would impair the ability to generate carbonless images by application of pressure to the carbonless set subsequent to printing of the concealed image.

U.S. Pat. No. 5,174,556 (Taylor et al.), the disclosure of which is totally incorporated herein by reference, discloses a document finisher which includes a printing station for printing on the binding of a book. The printing station in one embodiment prints on the binder tape before the book is bound. In a second embodiment, the printer prints on the binding after the book is bound. The printing stations are space efficient and designed to be easily incorporated with preexisting stations in document finishers. Ink jet printers and impact-type printer may be utilized.

U.S. Pat. No. 5,156,675 (Breton et al.), the disclosure of which is totally incorporated herein by reference, discloses fast drying ink compositions containing a colorant, a dye, water and a cosolvent. Some of the ink compositions dry in less than about I second and have a viscosity of between about 1.6 and about 2.5 centipoise and a specified surface tension. Some of the ink compositions contain specified cosolvents, preferably a mixture of diethylene glycol monobutyl ether and glycerol.

European Patent Publication 518,490, published Dec. 16, 1992, equivalent of copending application U.S. Ser. No.

07/700,967, filed May 16, 1991, entitled "Ink Jet Compositions Containing Desizing Agents," with the named inventors Marcel P. Breton, Shadi L. Malhotra, Toshitake Yui, Kerstin M. Henseleit, and Melvin D. Croucher, the disclosure of which is totally incorporated herein by reference, discloses an ink composition having a pH of about 5 to about 10 containing a colorant, a liquid carrier, and less than about 5 wt. % of a desizing agent. The desizing agent may be (1) poly(oxyalkylene) modified compounds of sorbitan esters, fatty amines, alkanol amides, castor oil, fatty acid, fatty alcohol; (2) hydrophilic poly(dialkyl-siloxanes); (3) fatty imidazolines; (4) fatty ester modified compounds of phosphate, sorbitan, glycerol, poly(ethylene glycol), sulfosuccinic acid, sulfonic acid, alkyl amine; (5) quaternary alkosulfate compounds; (6) poly(propylene oxide) - poly(ethylene oxide) copolymers; (7) poly( alkylene glycol); or (8) mixtures thereof.

Copending application U.S. Ser. No. 07/616,971, filed Nov. 21, 1990, entitled "Carbonless Paper for Ink Jet Printing," with the named inventors John F. Oliver, Richard E. Sandborn, and David J. Sanders, the disclosure of which is totally incorporated herein by reference, discloses a process for generating images which comprises incorporating into an ink jet printing apparatus a carbonless paper set which comprises a first sheet comprising a support containing a color developer capable of reacting with a color former to produce a color image, said color developer comprising high surface area silica particles, and a second sheet comprising a support coated with the color former, forming an image on the first sheet by causing ink to be expelled in droplets on a surface containing the color developer, and forming an image on the second sheet by causing ink to be expelled in droplets onto the surface opposite to that coated with the color former.

Copending application U.S. Ser. No. 07/806,508, filed Dec. 13, 1991, entitled "Carbonless Paper for Electrostatic Imaging Processes," with the named inventors David J. Sanders, John F. Oliver, and Marcel P. Breton, the disclosure of which is totally incorporated herein by reference, discloses a process which comprises incorporating into an electrostatic imaging apparatus a recording sheet comprising a support on one surface of which are situated microcapsules which comprise a shell and a core containing a color former and an oil, said microcapsules being strengthened with a polymer capable of degrading upon exposure to actinic radiation; generating an electrostatic latent image on an imaging member in the apparatus; developing the latent image with a developer; transferring the developed image to the recording sheet; and, subsequent to transfer, exposing the recording sheet to actinic radiation at a wavelength at which the polymer will degrade, thereby rendering the microcapsules subject to rupture upon application of pressure.

Copending application U.S. Ser. No. 07/922,882, filed Jul. 31, 1992, entitled "Colorless Fast-Drying Ink Compositions for Printing Concealed Images Detectable by Fluorescence," with the named inventors Françoise M. Winnik, Anthony R. Davidson, and Marcel P. Breton, the disclosure of which is totally incorporated herein by reference, discloses an ink composition consisting essentially of water, diethylene glycolmonobutyl ether (butyl carbitol), glycerol, an optional cyclohexyl pyrrolidinone component, a dye selected from the group consisting of dyes containing dansyl chromophores and dyes containing porphyrin chromophores, an optional biocide, and an optional polyalkylene oxide/bisphenol-A additive.

Copending application U.S. Ser. No. 07/877,502, filed May 1, 1992, entitled "Xerographic/Thermal Ink Jet Combined Printing," with the named inventors Thomas N. Taylor, LeRoy A. Baldwin, and Otto R. Dole, the disclosure of which is totally incorporated herein by reference, discloses a printer which combines the technologies of xerographic and thermal ink jet printing into a unit capable of high resolution text and color graphics. The printer is capable of forming a composite image, including a xerographic printing portion and a thermal ink jet (TIJ) printing portion, by printing the xerographic portion using known xerographic techniques and the thermal ink jet portion by a thermal ink jet printing array associated with the printer. The portions may be printed in any order, and may be dried by a drying station after printing of each portion or after both portions have been printed. At least one thermal ink jet printing array can serve as an annotator which is capable of printing additional information onto a copy, such as company letterhead, special instructions, addresses, or the like.

Accordingly, while known materials and processes are suitable for their intended purposes, a need remains for processes for printing concealed images on carbonless papers. In addition, a need remains for processes for printing concealed images on carbonless papers by methods entailing the use of standard office equipment such as ink jet printers. Further, there is a need for processes for printing concealed images on carbonless papers wherein the ink employed does not interact with the color former or color developer components of the carbonless paper in such a manner as to impair the pressure developability of the paper. Additionally, there is a need for processes for printing fast-drying concealed images on carbonless papers by ink jet printing methods without impairing the pressure developability of the paper. There is also a need for processes for printing concealed images on carbonless papers by ink jet printing methods wherein the resulting images are of good quality and contrast with respect to the background areas of the paper when viewed under the desired viewing conditions (such as exposure to ultraviolet light, infrared light, or the like). Further, there is a need for processes for printing concealed images on carbonless papers by ink jet printing methods wherein the carbonless papers also contain visible images generated by another printing method, such as electrophotography, electrography, ionography, lithography, offset printing, or the like. In addition, a need remains for processes for printing concealed images on carbonless papers by ink jet printing methods wherein the ink jet inks exhibit rapid drying times on the carbonless paper, thereby enabling the annotation via ink jet printing of xerographic copies with markings not visible to the naked eye in rapid document generation processes with no smearing of the ink jet images.

SUMMARY OF THE INVENTION

It is an object of the present invention to provide printing processes with the above-noted advantages.

It is another object of the present invention to provide processes for printing concealed images on carbonless papers.

It is yet another object of the present invention to provide processes for printing concealed images on carbonless papers by methods entailing the use of standard office equipment such as ink jet printers.

It is still another object of the present invention to provide processes for printing concealed images on carbonless papers wherein the ink employed does not interact with the color former or color developer components of the carbonless paper in such a manner as to impair the pressure developability of the paper.

Another object of the present invention is to provide processes for printing fast-drying concealed images on carbonless papers by ink jet printing methods without impairing the pressure developability of the paper.

Yet another object of the present invention is to provide processes for printing concealed images on carbonless papers by ink jet printing methods wherein the resulting images are of good quality and contrast with respect to the background areas of the paper when viewed under the desired viewing conditions.

Still another object of the present invention is to provide processes for printing concealed images on carbonless papers by ink jet printing methods wherein the carbonless papers also contain visible images generated by another printing method, such as electrophotography, electrography, ionography, lithography, offset printing, or the like.

It is another object of the present invention to provide processes for printing concealed images on carbonless papers by ink jet printing methods wherein the ink jet inks exhibit rapid drying times on the carbonless paper, thereby enabling the annotation via ink jet printing of xerographic copies with markings not visible to the naked eye in rapid document generation processes with no smearing of the ink jet images.

These and other objects of the present invention (or specific embodiments thereof) can be achieved by providing a process which comprises (1) incorporating into a printing apparatus capable of generating ink jet images a carbonless paper set comprising a first sheet, a second sheet, and optional intermediate sheets situated between the first sheet and second sheet, wherein the first sheet comprises paper coated on one surface with a color former and the second sheet comprises paper coated on one surface with a color developer, and wherein, when the carbonless paper set is assembled, the surface of the first sheet coated with the color former is in contact with the surface of a sheet coated with the color developer and the surface of the second sheet coated with the color developer is in contact with the surface of a sheet coated with the color former; (2) incorporating into the printing apparatus an ink jet ink comprising (a) water; (b) a member selected from the group consisting of glycols, sulfolane, and mixtures thereof; (c) optionally, a member selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether; (e) optionally, dipropylene glycol monomethyl ether acetate; and (f) a marking material which is substantially colorless and detectable when exposed to radiation outside of the visible wavelength range; and (3) causing droplets of the ink to be ejected in an imagewise pattern onto at least one surface of at least one of the sheets of the carbonless paper set.

DETAILED DESCRIPTION OF THE INVENTION

The process of the present invention entails applying an ink jet ink capable of generating concealed images on carbonless paper to selected areas of selected sheets of carbonless paper in an imagewise fashion via an ink jet printing process. Typically, the sheets of the carbonless paper set are incorporated into the printing apparatus prior to being assembled into a carbonless paper stack. The sheets include a first sheet coated with a color former, a second sheet coated with a color developer, and, optionally, intermediate sheets situated between the first and second sheets, said intermediate sheets being coated on one surface with the color former and on the other surface with the color developer. In areas of each sheet where it is desired to print concealed images, the ink is applied in imagewise fashion to the sheet.

The process of the present invention can be incorporated into the printing process in which carbonless paper forms are printed. In this embodiment, an ink jet printhead and the ink jet ink containing the marking material for generating concealed images are incorporated into the printing apparatus which generates the visible images on the carbonless paper forms. The visible images can be generated by any desired printing process, such as offset printing, electrophotographic printing, ink jet printing, or the like. Prior to, concurrently with, or subsequent to the printing of the visible images on the carbonless paper sheets, the ink capable of printing concealed images is applied to selected areas of selected sheets with the ink jet printhead. The completed sheets are subsequently assembled into carbonless paper stacks.

One specific embodiment of the present invention is directed to a printing process which comprises (1) incorporating into an imaging apparatus capable of generating both electrostatic images and ink jet images a carbonless paper set comprising a first sheet, a second sheet, and optional intermediate sheets situated between the first sheet and second sheet, wherein the first sheet comprises paper coated on one surface with a color former and the second sheet comprises paper coated on one surface with a color developer, and wherein, when the carbonless paper set is assembled, the surface of the first sheet coated with the color former is in contact with the surface of a sheet coated with the color developer and the surface of the second sheet coated with the color developer is in contact with the surface of a sheet coated with the color former; (2) generating an electrostatic latent image on an imaging member in the imaging apparatus, developing the latent image with a toner, and contacting the developed image on the imaging member with the first sheet of the carbonless paper set, thereby transferring the developed image to the first sheet; (3) generating an electrostatic latent image on the imaging member in the imaging apparatus, developing the latent image with a toner, and contacting the developed image on the imaging member with the second sheet of the carbonless paper set, thereby transferring the developed image to the second sheet; (4) optionally permanently affixing the transferred images to the first and second sheets; (5) incorporating into the printing apparatus an ink jet ink comprising (a) water; (b) a member selected from the group consisting of glycols, sulfolane, and mixtures thereof; (c) optionally, a member selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether; (e) optionally, dipropylene glycol monomethyl ether acetate; and (f) a marking material which is substantially colorless and detectable when exposed to radiation outside of the visible wavelength range; and (6) causing droplets of the ink to be ejected in an imagewise pattern onto at least one surface of at least one of the sheets of the carbonless paper set.

Another specific embodiment of the present invention is directed to a printing process which comprises (1) incorporating into an ink jet imaging apparatus a carbonless paper set comprising a first sheet, a second sheet, and optional intermediate sheets situated between the first sheet and second sheet, wherein the first sheet comprises paper coated on one surface with a color former and the second sheet comprises paper coated on one surface with a color developer, and wherein, when the carbonless paper set is assembled, the surface of the first sheet coated with the color former is in contact with the surface of a sheet coated with the color developer and the surface of the second sheet coated with the color developer is in contact with the surface of a sheet coated with the color former; (2) incorporating into the printing apparatus an ink jet ink comprising water and a colorant; (3) causing droplets of the ink containing the colorant to be ejected in an imagewise pattern onto at least one surface of the first sheet; (4) causing droplets of the ink containing the colorant to be ejected in an imagewise pattern onto at least one surface of the second sheet; (5) incorporating into the printing apparatus an ink jet ink comprising (a) water; (b) a member selected from the group consisting of glycols, sulfolane, and mixtures thereof; (c) optionally, a member selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether; (e) optionally, dipropylene glycol monomethyl ether acetate; and (f) a marking material which is substantially colorless and detectable when exposed to radiation outside of the visible wavelength range; and (6) causing droplets of the ink to be ejected in an imagewise pattern onto at least one surface of at least one of the sheets of the carbonless paper set.

In a particularly preferred embodiment of the present invention, the printing apparatus employs a thermal ink jet process, wherein the ink is contained in nozzles which are selectively heated in an imagewise pattern, thereby causing droplets of the ink to be ejected in imagewise pattern.

The ink compositions employed to generate concealed images on carbonless paper in the process of the present invention generally comprise a liquid vehicle and a marking material which is either colorless or only slightly colored in appearance to the naked eye under ordinary viewing conditions, but which is detectable under special viewing conditions, such as exposure to infrared light, ultraviolet light, or the like.

Any suitable marking material can be employed. The marking material can be either a dye (soluble in the liquid vehicle) or a pigment (insoluble in the liquid vehicle). Specific examples of suitable dyes include those with a porphyrin chromophore, such as 5,10,15,20-tetrakis-(1-methyl- 4-pyridyl)-21H,23H-porphine tetra-p-tosylate salt, available form Aldrich Chemical Corporation, 5, 10,15,20-tetrakis-( 1 -methyl-4-pyridyl)-21H,23H-porphine tetrachloride salt, 5,10,15,20-tetrakis-(1-methyl-4-pyridyl)- 21H, 23H-porphine tetrabromide salt, 5,10,15,20-tetrakis-(1-methyl-4-pyridyl)- 21H,23H-porphine tetra-acetate salt, 5,10,15,20-tetrakis-( 1-methyl- 4-pyridyl)-21H,23H-porphine tetra-perchlorate salt, 5, 10, 15,20-tetrakis-(1-methyl-4-pyridyl)-21H,23H-porphine tetrafluoroborate salt, 5,10, 15,20-tetrakis-( 1-methyl-4-pyridyl)-21H,23H-porphine tetra-perchlorate salt, 5,10,15,20-tetrakis-(1-methyl-4-pyridyl)-21H,23H-porphine tetra-triflate salt, 5, 10,15,20-tetrakis-( 1-hydroxymethyl-4-pyridyl)-21H,23H-porphine tetra-p-tosylate salt, 5, 10,15,20-tetrakis-[1-(2-hydroxyethyl)-4-pyridyl]- 21H,23H-porphine tetrachloride salt, prepared as described, for example, by V. N. Madakyan in *Chemistry of Heterocyclic Compounds,* 1986, pages 167 to 171, the disclosure of which is totally incorporated herein by reference, 5, 10, 15,20-tetrakis-[1 -(3-hydroxypropyl)-4-pyridyl]-21H,23H-porphine tetra-p-tosylate salt, 5, 10, 15,20-tetrakis-[ 1 -(2-hydroxypropyl)-4-pyridyl]-21H,23H-porphine tetra-p-tosylate salt, 5, 10, 15,20-tetrakis-[ 1 -(2-hydroxyethoxyethyl)- 4-pyridyl]-21H,23H-porphine tetra-p-tosylate salt, 5,10, 15,20-tetrakis-[ 1 -(2-hydroxyethoxypropyl)-4-pyridyl]-21H,23H-porphine tetra-p-tosylate salt, 5,10,15,20-tetrakis-[4-(trimethylammonio)phenyl]-21H,23H-porphine tetra-p-tosylate salt, available from Aldrich Chemical Corporation, 5,10,15,20-tetrakis-[4-(trimethylammonio)phenyl]-21H, 23H-porphine tetrachloride salt, 5,10,15,20-tetrakis-[ 4-(trimethylammonio)phenyl]-21H,23 H-porphine tetrabromide salt, 5,10,15,20-tetrakiso[4-(trimethylammonio)phenyl]-21H,23H-porphine tetra-acetate salt, 5,10,15,20-tetrakis-[4(trimethylammonio)phenyl]-21H,23H-porphine tetra-perchlorate salt, 5,10,15,20-tetrakis-[4-(trimethylammonio)phenyl]-21H,23H-porphine tetrafluoroborate salt, 5, 10, 15,20-tetrakis-[4-(trimethylammonio)phenyl]- 21H,23H-porphine tetra-triflate salt, meso-(N-methyl-X-pyridinium-)$_n$(phenyl)- 4-n-21H,23H-porphine tetra-p-tosylate salt, where n is an integer of value 0, 1, 2, or 3, and where X=4-(para), 3-(meta), or 2-(ortho) and refers to the position of the nitrogen in the pyridinium substituent, prepared as described, for example, by M. A. Sari et al. in *Biochemistry,* 1990, 29, 4205 to 4215, the disclosure of which is totally incorporated herein by reference, meso-tetrakis-[o-(N-methylnicotinamido)phenyl]- 21H,23H-porphine tetra-methyl sulfonate salt, prepared as described, for example, by G. M. Miskelly et al. in *Inorganic Chemistry,* 1988, 27, 3773 to 3781, the disclosure of which is totally incorporated herein by reference, 5,10,15,20-tetrakis-(2-sulfonatoethyl-4-pyridyl)-21H,23H-porphine chloride salt, prepared as described by S. Igarashi and T. Yotsuyanagi in *Chemistry Letters,* 1984, 1871, the disclosure of which is totally incorporated herein by reference, 5, 10, 15,20-tetrakis-(carboxymethyl-4-pyridyl)-21H,23H-porphine chloride salt, 5, 10,15,20-tetrakis-(carboxyethyl-4-pyridyl)-21H,23H-porphine chloride salt, 5,10,15,20-tetrakis-(carboxyethyl-4-pyridyl)- 21H,23H-porphine bromide salt, 5, 10, 15,20-tetrakis-(carboxylate-4-pyridyl)- 21H,23H-porphine bromide salt, prepared as described by D. P. Arnold in *Australian Journal of Chemistry,* 1989, 42, 2265 to 2274, the disclosure of which is totally incorporated herein by reference, 2,3,7, 8,12,13,17,18-octa-( 2-hydroxyethyl)-21H-23H-porphine, 2,3,7,8,12,13,17,18-octa-(2-hydroxyethoxyethyl)- 21H-23H-porphine, 2,3,7,8,12,13,17,18-octa-(2-aminoethyl)- 21H-23H-porphine, 2,3,7,8,12,13,17,18-octa-(2-hydroxyethoxypropyl)- 21H-23H-porphine, and the like, as well as mixtures thereof. Also suitable are dansyl dyes, including dansyl-L-alanine, Dansyl-L-α-amino-n-butyric acid, α-dansyl-L-arginine, dansyl-L-asparagine, dansyl-L-aspartic acid, dansyl-L-cysteic acid, N,N'-di-dansyl-L-cystine, dansyl-L-glutamic acid, dansyl-L-glutamine, N-dansyl-trans-4-hydroxy-L-proline, dansyl-L-isoleucine, dansyl-L-leucine, di-dansyl-L-lysine, N-ε-dansyl-L-lysine, dansyl-L-methionine, dansyl-L-norvaline, dansyl-L-phenylalanine, dansyl-L-proline, N-dansyl-L-serine, N-dansyl-L-threonine, Nα-dansyl-L-tryptophan, N,O-di-dansyl-L-tyrosine monocyclohexylammonium salt, dansyl-L-valine, dansyl-γ-amino-n-butyric acid, dansyl-DL-α-amino-n-butyric acid, dansyl-DL-aspartic acid, dansyl-DL-glutamic acid, dansylglycine, dansyl-DL-leucine, dansyl-DL-methionine, dansyl-DL-norleucine, dansyl-DL-norvaline, dansyl-DL-phenylalanine, dansylsarcosine, N-dansyl-DL-serine, N-dansyl-DL-threonine, Nα-dansyl-DL-tryptophan, dansyl-DL-valine, dansyl-DL-α-aminocaprylic acid cyclohexylamine salt, (dansylaminoethyl)trimethylammonium perchlorate, didansylcadaverine, monodansylcadaverine, dansyl-putrescine, dansylspermidine, didansyl-1,4-diamino-butane, didansyl-1,3-diamino-propane, didansylhistamine, all available from Sigma Chemical Corp., St. Louis, Miss., and the like, as well as mixtures thereof.

In addition to dyes, pigments or marking materials insoluble in the liquid vehicle of the ink are also suitable marking materials. For example, polymeric micelles comprising ABA diblock copolymers having covalently bonded thereto dyes which are substantially colorless but detectable when exposed to radiation outside the visible wavelength range, as disclosed in, for example, U.S. Pat. No. 5,145,518, the disclosure of which is totally incorporated herein by reference, are suitable marking materials for the present invention.

If the carbonless paper (or one of the sheets to be printed with concealed images in the carbonless paper set) contains fluorescent brighteners, preferably the marking material is selected so that the concealed images can easily be distinguished from or contrasted with the carbonless paper. For example, if the top sheet of the carbonless paper set is a white sheet containing fluorescent brighteners which fluoresce in the blue region, it is preferred that the marking material be either a material which fluoresces in a region other than the blue region or a material which is detectable by a means other than fluorescence, such as infrared radiation and detection.

The liquid vehicle comprises (a) water; (b) a member selected from the group consisting of glycols (such as ethylene glycol, diethylene glycol, triethylene glycol, dipropylene glycol, tripropylene glycol, and the like), sulfolane, and mixtures thereof; (c) a member selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether (butyl carbitol); and (e) dipropylene glycol monomethyl ether acetate. Diethylene glycol monobutyl ether (butyl carbitol) is widely available commercially, such as from Aldrich Chemical Company, Milwaukee, Wis. Dipropylene glycol monomethyl ether acetate is also commercially available as, for example, Arcosolv DPMA from ARCO Chemicals, Philadelphia, Pa. and Dowanol from Dow Chemical Company, Midland, Mich.

This particular ink composition enables several advantages, such as fast drying images, improved ink latency in ink jet printing processes, enablement of lower concentrations of water in the liquid vehicle, and in some instances wherein dyes are the selected marking materials, enhanced compatibility with the dye. The surface tension of the ink is also of a desirable value; it is preferred that the surface tension of the ink be lower than the surface tension of the carbonless paper sheet onto which the ink is to be printed. Typical ink surface tensions are from about 25 to about 45 dynes per square centimeter (milliNewtons per square meter), preferably from about 28 to about 38 dynes per square centimeter, although the ink surface tension can be outside these ranges. Further, the ink composition enables printing on the first sheet of a carbonless set when the first sheet has been coated with a hydrophobic material. In some instances, the first sheet of a carbonless paper set is coated with a hydrophobic material so that when an adhesive is applied to the sheets, the sheets of a single carbonless paper set adhere to each other but sheets of adjacent sets do not adhere to each other. The present invention enables printing on the entire surface of each sheet of a carbonless paper set even when one or more sheets have been coated with a hydrophobic material. Inks of the present invention are also particularly desirable in that they do not interact adversely with the color former or color developer materials of known carbonless paper formulations, and thus do not impair the ability to generate carbonless images by application of pressure to a carbonless set subsequent to printing concealed images on one or more sheets of the set.

The ink ingredients can be present in any effective relative amounts. Typically, the marking material is present in the ink in an amount of from about 0.1 to about 6 percent by weight, and preferably from about 0.5 to about 4 percent by weight, although the amount can be outside this range. Typically, the glycol or sulfolane component is present in the ink in an amount of from about 5 to about 30 percent by weight, and preferably from about 5 to about 20 percent by weight, although the amount can be outside this range. Typically, the lower alkyl alcohol component is present in the ink in an amount of from 0 to about 10 percent by weight, and preferably from 0 to about 5 percent by weight, although the amount can be outside this range. Typically, diethylene glycol monobutyl ether is present in the ink in an amount of from about 6 to about 20 percent by weight, and preferably from about 9 to about 15 percent by weight, although the amount can be outside this range. Typically, dipropylene glycol monomethyl ether acetate is present in the ink in an amount of from 0 to about 10 percent by weight, and preferably from about 2 to about 8 percent by weight, although the amount can be outside this range. Water makes up the balance of the ink composition, being present typically in an amount of from about 24 to about 88.9 percent by weight, although the amount can be outside this range.

Inks can be prepared by any process suitable for preparing aqueous-based inks. For example, the ink ingredients can be mixed in the desired amounts and stirred until a uniform ink composition results (typically about 30 minutes or more, preferably about 2 hours at about 25° C., although the mixing/stirring time can be either greater or less than this time). While not required, the ink ingredients can be heated during mixing if desired. Subsequent to mixing and stirring, the ink composition generally is filtered, preferably with a 0.5 micron filter, to remove any solid or particulate matter. Any other suitable processes for preparing inks can also be employed.

The ink compositions are generally of a viscosity suitable for use in thermal ink jet printing processes. Typically, the ink viscosity is no more than about 8 centipoise, and preferably is from about 1 to about 2.5 centipoise, although the viscosity can be outside this range.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central moiety. This additive is of the formula

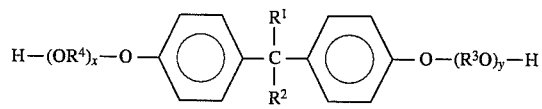

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The carbonless paper sets employed in the processes of the present invention comprise at least two sheets of base paper, each of which contains on one surface either a color former or a color developer. Alternatively, both the color former and the color developer can be contained on the surface of one of the sheets. Optional intermediate sheets contain on one surface a color former and on the other surface a color developer or, alternatively, contain on one surface both a color former and a color developer. The supporting base paper may comprise pulp fibers and blends thereof originating from bleached hardwood and softwood fibers, bleached mechanical pulp fibers, cotton fibers, and synthetic fibers. More specifically, examples of suitable cellulosic pulps include Domtar Seagul W and Q90, a 75/25 percent bleached hardwood and softwood blend of fibers, and 100% bleached groundwood pulp (Acadia Forest Products Ltd.). For those familiar with the art of papermaking, formed sheets derived from cellulosic pulps should be suitably sized so as to minimize penetration of subsequent coating material. Internal and surface sizing treatments include, for example, rosin acid/alum, alkyl ketene dimer, starch, and/or various synthetic polymers.

The color formers generally comprise a binder plus microcapsules containing a color forming material dissolved in a suitable solvent. In general, the color forming material can be either a substantially colorless basic dye precursor, or an organic complexing agent, or a combination of the two. The color forming material may be a colorless basic dye precursor such as, for example, benzoyl leuco methylene blue; diaryl phthalides such as 3,3-bis (4-dimethylaminophenyl)-6-dimethylaminophthalide (Crystal Violet Lactone) and 3,3-bis (4-dimethylaminophenyl) phthalide (Malachite Green Lactone); other phenyl-, indolpyrrol-, and carbazol- substituted phthalides; leucauramines; acyl auramines; unsaturated aryl ketones; basic mono azo dyes; Rhodamine B Lactams; polyaryl carbinols; nitro-, amino-, amido-, sulfon amido-, aminobenzylidene-, halo-, and anilino- substituted fluorans, such as 3-diethylamino-6-methyl-7-anilinofluoran; spirodipyrans; pyridine and pyrazine compounds; or the like. Examples of colorless basic dye precursors are disclosed in U.S. Pat. No. 2,417,897, U.S. Pat. No. 3,672,935, U.S. Pat. No. 3,681,390, U.S. Pat. No. 4,202,820, and U.S. Pat. No. 4,675,706, the disclosures of which are totally incorporated herein by reference. The color forming material may also be an organic complexing agent. Examples of organic complexing agents include those listed in U.S. Pat. No. 3,481,759, U.S. Pat. No. 4,334,015, and U.S. Pat. No. 4,372,582, the disclosures of which are totally incorporated herein by reference. Examples of organic complexing agents include dithiooxamide and its derivatives such as N,N'-di-benzyldithiooxamide, N,N'-bis(2-octanlyloxyethyl) dithiooxamide, and di-dodecyl dithiooxamide; aromatic substituted hydrazones such as those disclosed in U.S. Pat. No. 4,334,015 or the like.

Typically the chosen color former material, or combination of color former materials, is dissolved in a suitable organic solvent and encapsulated in a hard polymeric shell by one of several known encapsulation techniques. Examples of suitable solvents include alkyl biphenyls such as propylbiphenyl and butylbiphenyl; dialkyl phthalates such as diethytphthalate, dibutylphthalate, dioctyiphthalate, dinonylphthalate, and ditridecylphthalate; alkylated naphthalenes such as dipropylnaphthalene; $C_{10}$–$C_{14}$ alkyl benzenes such as dodecyl benzene; alkyl or aralkyl benzoates such as benzyl benzoate; benzylxylene; benzylbutylphthalate; ethyldiphenylmethane; 2,2,4-trimethyl-1,3-pentanediol diisobutyrate; partially hydrogenated terphenyls; cyclohexane; toluene; 3-heptanone; tributyl phosphate; and mixtures of the above. The solvents for the color former can include any of the above which possess sufficient solubility for the color former. A suitable solvent should be capable of dissolving at least about 1 percent by weight and preferably from about 2 to about 10 percent by weight of the color former. In the case of a basic dye precursor/acidic polymer developer system, or an organic complexing agent/transition metal salt system, the color former solvent preferably is also a cosolvent for the color developer material to promote the color forming reaction. Of course, a suitable solvent must also be a non-solvent for the chosen microcapsule wall material.

Minute droplets of color former solution are produced by emulsifying the solvent oil in an aqueous medium. The color former solution droplets can then be encapsulated in a polymeric shell by any one of a number of known microencapsulation techniques, such as coacervation, complex coacervation, interfacial polymerization, in-situ polymerization, or the like. Methods for encapsulating minute droplets of color former solution in a polymeric shell are described in, for example, U.S. Pat. No. 2,800,457, U.S. Pat. No. 2,800,458, U.S. Pat. No. 3,418,250, and U.S. Pat. No. 3,516,941, the disclosures of each of which are totally incorporated herein by reference. Capsule wall forming materials include but are not limited to gelatin wall formers such as gum arabic, polyvinyl alcohol, and carboxymethylcellulose; isocyanate wall-formers; urea-formaldehyde and urea-resorcinol-formaldehyde; melamine-formaldehyde; polyurea; polyurethane; polyamide; polyester; and the like. The completed microcapsules are typically from about 1 to about 50 microns and preferably from about 5 to about 10 microns in diameter. The capsule fill of color former in solvent typically comprises from about 50 to about 95 percent of the total capsule weight.

A coating formulation is prepared by mixing an aqueous dispersion of microcapsules containing color former solution with an aqueous dispersion of a suitable binder, such as starch, polyvinyl alcohol, latex, or the like with a capsule:binder ratio typically being from about 9:1 to about 7:3. The capsule plus binder dispersion is then coated onto a paper support using any one of a number of known paper coating techniques, such as roll, gravure, air-knife, blade, rod, or slot die coating, although methods that minimize capsule breakage, such as roll and air-knife, are preferred.

Optionally, the color former coating can also include from about 5 to about 10 percent by weight of particles of somewhat larger size than the microcapsules. For example, as disclosed in U.S. Pat. No. 4,630,079, the disclosure of which is totally incorporated herein by reference, the color former coating contains particles of somewhat larger size than the microcapsules to prevent or reduce accidental or premature breakage of the microcapsules. Such particles typically comprise fine powders of cellulose, starch granules, or various types of plastic beads. Dry coat weights for the color former coating typically range from about 2 to about 10 grams per square meter, which typically includes from about 1 to about 5 grams per meter of solvent and from about 0.01 to about 0.1 grams per square meter of color former, with the balance comprising binder, capsule material, and any other ingredients in the coating.

Conventional carbonless paper technology typically employs one of two approaches. In the first, the color former is a colorless precursor dye which becomes colored upon contact with the relatively acidic surface of the color developer. One example of a commercially available carbonless paper employing this approach is the NCR brand of carbonless paper manufacured by Appleton Papers Inc., Appleton, Wis. For a basic dye precursor color former, the corresponding color developer generally comprises an acidic developer material. Acidic color developers may be inorganic pigments such as acidic clay, active clay, attapulgite, zeolite, bentonite, kaolin, silicic acid, synthetic silicic acid, aluminum silicate, zinc silicate, and the like; organic acids such as tannic acid, gallic acid, benzoic acid, propyl gallate, and bisphenoI-A; acidic polymers such as phenolic resins, including phenol-aldehyde polymers, phenol-acetylene polymers, and rosin maleate resin; aromatic carboxylic acids such as salicylic acid and its derivatives; metal salts of aromatic carboxylic acids such as zinc salicylate; zinc-chelated phenolic resins; oil soluble metal salts of phenol-formaldehyde resins; and combinations of the above. To produce the bottom sheet of a carbonless paper set, solid particles of the color developer material are mixed with a suitable binder such as latex, polyvinyl alcohol, starch, gum arabic, or other film-forming material, and coated on the top of a paper support. The acidic color developer material may also be mixed with neutral inorganic pigments such as various clays or calcium carbonate, along with a suitable binder to form the color developer coating. In the case of an inorganic acidic developer material, a coating formulation is prepared by mixing an aqueous dispersion of the acid clay with a suitable binder such as starch, polyvinyl alcohol, or latex, with a clay:binder ratio typically between about 9:1 and about 6:4. This mixture can be coated onto a paper support by any of a number of known techniques, including roll, gravure, air-knife, blade, slot die, or the like. In the case of an organic acidic color developer material, it may be dissolved or dispersed in a suitable organic solvent vehicle to form a printing ink that can be coated on a paper support by any of a number of known techniques. Alternately, the organic acidic developer material may be ground into fine particle form, to furnish a large reactant surface per unit area for the color former, and mixed in an aqueous dispersion with a suitable binder, with particle:binder ratios typically between about 9:1 and about 6:4, and coated on a paper support by any of a number of known techniques. Additionally, fine particles of organic acidic color developer may be mixed with a neutral inorganic pigment such as various clays or calcium carbonate to promote absorption of the color former solution, and dispersed in an aqueous medium with suitable binders, with typical acid resin:pigment:binder ratios of 15:75: 10, and coated on a paper support by any of a number of known techniques. Acidic color developers are disclosed in, for example, U.S. Pat. No. 3,244,550, U.S. Pat. No. 3,672,935, U.S. Pat. No. 3,732,120, U.S. Pat. No. 3,843,383, and U.S. Pat. No. 3,934,070, the disclosures of each of which are totally incorporated herein by reference.

In the second approach, the color former is a colorless material that forms a colored metal complex upon contacting the color developer surface. One example of a commercially available carbonless paper employing this approach is 3M Tartan, available from the Minnesota Mining and Manufacturing Company, St. Paul, Minn. For an organic complexing agent color former, the corresponding color developer generally comprises a salt of a transition metal such as Ni, Cu, Co, or Zn. Examples of transition metal salts for color developers include nickel 2-ethylhexoate and nickel rosinate. A color developer sheet may be produced by adding to the initial paper pulp slurry a water soluble rosin salt such as sodium rosinate, along with a water soluble metal salt such as nickel sulphate, which causes an insoluble metal rosinate, i.e. nickel rosinate, to be precipitated as a sizing on the paper fibers. The treated fibers are then formed into a paper sheet by conventional papermaking techniques. Alternately, an aqueous dispersion of nickel rosinate may be coated on the surface of a paper support by any of a number of known techniques. Additionally, a transition metal salt such as nickel 2-ethylhexoate may be combined in an aqueous dispersion with an inorganic pigment such as various clays or aluminum oxide, along with suitable binders, and coated on a paper support by any of a number of known techniques. To produce the bottom sheet of a carbonless paper set, the transition metal salt is mixed with an inorganic pigment such as various clays, along with a suitable binder, and coated on the top of a paper support. Transition metal color developers are disclosed in U.S. Pat. No. 3,481,759, U.S. Pat. No. 3,809,668, and U.S. Pat. No. 4,334,015, the disclosures of which are totally incorporated herein by reference. As disclosed in U.S. Pat. No. 4,372,582, the disclosure of which is totally incorporated herein by reference, if the micro-encapsulated color former is a combination of a basic dye precursor and an organic complexing agent, the appropriate color developer coating contains both an acidic developer material and a transition metal salt.

In all cases, the dry coat weight of the color developer coating typically ranges from about 1 to about 10 grams per square meter, which generally includes from about 0.5 to about 5 grams per square meter of color developer material. In general, there is typically an excess of color developer available to the color former material, or at least 5 to 10 grams of color developer per gram of color former.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE

An ink composition was prepared by adding 200 milligrams of dansyl lysine dye (obtained from Sigma Chemical Corp., St. Louis, Miss.) to 10 milliliters of a solution containing 10 percent by weight isopropanol, 15 percent by weight butyl carbitol, 5 percent by weight Arcosolv DPMA (dipropylene glycol monomethyl ether acetate, obtained from ARCO Chemical Co., Philadelphia, Pa.), 10 percent by weight ethylene glycol, and 60 percent by weight deionized water. A highly fluorescent pale yellow ink was obtained with a surface tension as measured with a Krüss D10T tensiometer at 25° C. (Plate probe) of 30.0 dynes per centimeter.

The ink composition thus prepared was incorporated into a Hewlett-Packard DeskJet 500C printer on the three sheets of a Xerox three-part straight precollated carbonless paper set (Part No. 3R4263, obtained from Xerox Canada Ltd., North York, Ontario) and on the three sheets of an NCR Rally three-part carbonless paper set (obtained from Appleton Papers, Inc., Appleton, Wis.). Patterns exhibiting both solid areas and printed areas were generated. Fluorescence from the solid areas was measured using a SPEX 212 Fluorolog spectrometer. Spectra were obtained in the front face geometry for the blank and solid printed areas on all sheets. Under UV illumination, all fluorescent images were clearly visible to the naked eye.

The drying times of the ink on the aforementioned papers were estimated by measuring the absorption times of a 10 microliters drop of the ink on the different carbonless paper sheets. The drying times ranged from about 300 seconds for the top Coated Back sheet of the NCR Rally paper to about 80 seconds for the Rally yellow Coated Front and Back sheet and 60 seconds for the pink Coated Front sheet of the same paper. Since the drop volume generated from a color cartridge (H-P 500C printer) is about 75 picoliters, it is estimated that this ink will dry in about 2.25 seconds on the NCR Rally paper and in about 0.45 seconds on the Rally pink paper. Dry times for the 10 microliter drops ($DT_{small}$) were extrapolated from the dry times for the large drops ($DT_{large}$), the volume of the large drop ($V_{large}$), the volume of the small drop ($V_{small}$), and the number of small drops needed to cover the area of the large drop ((Nb) (wherein the area of the large drop is calculated by measuring the radius of the large drop (R) and calculating area (A) by A=nR2) by the following formula:

$$DT_{small} = DT_{large} \times \frac{V_{large}}{V_{small}} \times Nb$$

Other embodiments and modifications of the present invention may occur to those skilled in the art subsequent to a review of the information presented herein; these embodiments and modifications, as well as equivalents thereof, are also included within the scope of this invention.

What is claimed is:

1. A process which comprises the steps of: (1) incorporating into a printing apparatus for generating ink jet images a carbonless paper set comprising a first sheet having two major surfaces, a second sheet having two major surfaces, and optional intermediate sheets having two major surfaces situated between the first sheet and second sheet, wherein the first sheet comprises paper coated on one surface with a color former and the second sheet comprises paper coated on one surface with a color developer, and wherein, when the carbonless paper set is assembled, the surface of the first sheet coated with the color former is in contact with the surface of a sheet coated with the color developer and the surface of the second sheet coated with the color developer is in contact with the surface of a sheet coated with the color former; (2) incorporating into the printing apparatus an ink jet ink comprising (a) water; (b) a member selected from the group consisting of glycols, sulfolane, and mixtures thereof; (c) optionally, an alcohol component selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether; (e) optionally, dipropylene glycol monomethyl ether acetate; and (f) a marking material which is substantially colorless and detectable when exposed to radiation outside of a visible wavelength range; and (3) causing droplets of the ink to be ejected in an imagewise pattern onto at least one surface of at least one of the sheets of the carbonless paper set.

2. A process according to claim 1 wherein the ink jet ink comprises water, ethylene glycol, isopropanol, diethylene glycol monobutyl ether, dipropylene glycol monomethyl ether acetate, and the marking material.

3. A process according to claim 1 wherein the ink jet ink contains the marking material in an amount of from about 0.1 to about 6 percent by weight, the glycol or sulfolane component in an amount of from about 5 to about 30 percent by weight, the alcohol component in an amount of from 0 to about 5 percent by weight, diethylene glycol monobutyl ether in an amount of from about 6 to about 20 percent by weight, dipropylene glycol monomethyl ether acetate in an amount of from 0 to about 10 percent by weight, and water in an amount of from about 24 to about 88.9 percent by weight.

4. A process according to claim 1 wherein the ink jet ink has a surface tension of from about 25 to about 45 dynes per square centimeter.

5. A process according to claim 1 wherein the marking material is a dye selected from the group consisting of 5,10,15,20-tetrakis-( 1-methyl-4-pyridyl)-21H,23H-porphine tetra-p-tosylate salt; 5,10,15,20-tetrakis-( 1-methyl-4- pyridyl)-21H,23H-porphine tetrachloride salt; 5,10,15,20-tetrakis-(1-methyl-4-pyridyl)-21H,23H-porphine tetrabromide salt; 5,10,15,20-tetrakis-(1-methyl-4-pyridyl)-21H,23H-porphine tetraacetate salt; 5,10,15,20-tetrakis-(1-methyl-4-pyridyl)-21H,23H-porphine tetra-perchlorate salt; 5,10,15,20-tetrakis-(1-methyl-4-pyridyl)-21H,23H-porphine tetrafluoroborate salt; 5,10,15,20-tetrakis-( 1 -methyl-4-pyridyl)- 21H,23H-porphine tetra-perchlorate salt; 5,10, 15,20-tetrakis-(1-methyl-4-pyridyl)- 21H,23H-porphine tetra-triflate salt; 5,10,15,20-tetrakis-(1-hydroxymethyl-4-pyridyl)-21H,23H-porphine tetra-p-tosylate salt; 5,10,15, 20-tetrakis-[1-(2-hydroxyethyl)-4-pyridyl]-21 H,23H-porphine tetrachloride salt; 5,10,15,20-tetrakis-[1-(3-hydroxypropyl)-4-pyridyl]- 21H,23H-porphine tetra-p-tosylate salt; 5,10,15,20-tetrakis-[1-(2-hydroxypropyl)- 4-pyridyl]- 21H,23H-porphine tetra-p-tosylate salt; 5,10,15,20-tetrakis-[1-(2-hydroxyethoxyethyl)-4-pyridyl]-21H,23H-porphine tetra-p-tosylate salt; 5,10,15,20-tetrakis-[1-(2-hydroxyethoxypropyl)-4pyridyl]-21H,23H-porphine tetra-p-tosylate salt; 5,10,15,20-tetrakis-[4-(trimethylammonio)phenyl]-21H,23H-porphine tetra-p-tosylate salt; 5,10,15,20-tetrakis-[4-(trimethylammonio)phenyl]-21H,23H-porphine tetrachloride salt; 5,10,15,20-tetrakis-[4-(trimethylammonio)phenyl]- 21H,23H-porphine tetrabromide salt; 5,10,15,20-tetrakis-[4-(trimethylammonio)phenyl]-21H,23H-porphine tetra-acetate salt; 5,10,15, 20-tetrakis-[4-(trimethylammonio)phenyl]-21H,23H-porphine tetraperchlorate salt; 5,10,15,20-tetrakis-[4-(trimethylammonio)phenyl]- 21H,23H-porphine tetrafluoroborate salt; 5,10,15,20-tetrakis-[4-(trimethylammonio)phenyl]-21H,23H-porphine tetra-triflate salt; meso-(N-methyl-X-pyridinium)$_n$-(phenyl)- 4-n-21H,23H-porphine tetra-p-tosylate salt, where n is an integer of value 0, 1, 2, or 3, and where X=4-(para), 3-(meta), or 2-(ortho) and refers to the position of the nitrogen in the pyridinium substituent; meso-tetrakis-[o-(N-methylnicotinamido)phenyl]- 21H,23H-porphine tetra-methyl sulfonate salt; 5,10, 15,20-tetrakis-(2-sulfonatoethyl- 4-pyridyl)-21H,23H-porphine chloride salt; 5,10,15,20-tetrakis-(carboxymethyl-4-pyridyl)-21H,23H-porphine chloride salt; 5,10,15,20-tetrakis-(carboxyethyl-4-pyridyl)-21H,23H-porphine chloride salt; 5,10,15,20-tetrakis-(carboxyethyl-4-pyridyl)-21H, 23H-porphine bromide salt; 5, 10, 15,20-tetrakis-(carboxylate-4-pyridyl)-21H,23H-porphine bromide salt; 2,3,7,8,12, 13,17,18-octa-(2-hydroxyethyl)-21H-23H-porphine; 2,3,7,8, 12,13, 17,18-octa-(2-hydroxyethoxyethyl)-21H-23H-porphine; 2,3,7,8,12,13,17,18-octa-(2-aminoethyl)-2 1H-23H-porphine; 2,3,7,8,12,13,17,18-octa-(2-hydroxyethoxypropyl)-21H-23H-porphine; and mixtures thereof.

6. A process according to claim 1 wherein the marking material is a dye selected from the group consisting of dansyl-L-alanine; Dansyl-L-α-amino-n-butyric acid; α-dansyl-L-arginine; dansyl-L-asparagine; dansyl-L-aspartic acid; dansyl-L-cysteic acid; N,N'-di-dansyl-L-cystine; dansyl-L-glutamic acid; dansyl-L-glutamine; N-dansyl-trans-4-hydroxy-L-proline; dansyl-L-isoleucine; dansyl-L-leucine; didansyl-L-lysine; N-ε-dansyl-L-lysine; dansyl-L-methionine; dansyl-L-norvaline; dansyl-L-phenylalanine; dansyl-L-proline; N-dansyl-L-serine; N-dansyl-L-threonine; Nα-dansyl-L-tryptophan ; N,O-di-dansyl-L-tyrosine monocyclohexylammonium salt; dansyl-L-valine; dansyl-γ-amino-n-butyric acid; dansyl-DL-α-amino-n-butyric acid; dansyl-DL-aspartic acid; dansyl-DL-glutamic acid; dansylglycine; dansyl-DL-leucine; dansyl-DL-methionine; dansyl-DL-norleucine; dansyl-DL-norvaline; dansyl-DL-phenylalanine; dansylsarcosine; N-dansyl-DL-serine ; N-dansyl-DL-threonine ; Nα-dansyl-DL-tryptophan; dansyl-DL-valine; dansyl-DL-α-aminocaprylic acid cyclohexylamine salt; (dansylaminoethyl)-trimethylammonium perchlorate; didansylcadaverine; monodansylcadaverine; dansylputrescine; dansylspermidine; didansyl-1,4-diamino-butane; didansyl-1,3-diamino-propane; didansylhistamine; and mixtures thereof.

7. A process according to claim 1 wherein the marking material is a pigment.

8. A process according to claim 1 wherein the ink jet ink has a viscosity of no more than about 8 centipoise.

9. A process according to claim I wherein the printing apparatus employs a thermal ink jet printing process wherein the ink is contained in nozzles which are selectively heated in an imagewise pattern, thereby causing droplets of the ink to be ejected in imagewise pattern.

10. A printing process which comprises steps of (1) incorporating into an imaging apparatus capable of generating both electrostatic images and ink jet images a carbonless paper set comprising a first sheet having two major surfaces, a second sheet having two major surfaces, and optional intermediate sheets having two major surfaces situated between the first sheet and second sheet, wherein the first sheet comprises paper coated on one surface with a color former and the second sheet comprises paper coated on one surface with a color developer, and wherein, when the carbonless paper set is assembled, the surface of the first sheet coated with the color former is in contact with the surface of a sheet coated with the color developer and the surface of the second sheet coated with the color developer is in contact with the surface of a sheet coated with the color former; (2) generating an electrostatic latent image on an imaging member in the imaging apparatus, developing the latent image with a toner, and contacting the developed image on the imaging member with the first sheet of the carbonless paper set, thereby transferring the developed image to the first sheet; (3) generating an electrostatic latent image on the imaging member in the imaging apparatus, developing the latent image with a toner, and contacting the developed image on the imaging member with the second sheet of the carbonless paper set, thereby transferring the developed image to the second sheet; (4) optionally permanently affixing to the first and second sheets the developed images transferred thereto in steps (2) and (3); (5) incorporating into the imaging apparatus an ink jet ink comprising (a) water; (b) a member selected from the group consisting of glycols, sulfolane, and mixtures thereof; (c) optionally, a member selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether; (e) optionally, dipropylene glycol monomethyl ether acetate; and (f) a marking material which is substantially colorless and detectable when exposed to radiation outside of a visible wavelength range; and (6) causing droplets of the ink to be ejected in an imagewise pattern onto at least one surface of at least one of the sheets of the carbonless paper set.

11. A process according to claim 10 wherein the imaging apparatus employs a thermal ink jet printing process, wherein the ink is contained in nozzles which are selectively heated in an imagewise pattern, thereby causing droplets of the ink to be ejected in imagewise pattern.

12. A printing process which comprises steps of (1) incorporating into an ink jet imaging apparatus a carbonless paper set comprising a first sheet having two major surfaces, a second sheet having two major surfaces, and optional intermediate sheets having two major surfaces situated between the first sheet and second sheet, wherein the first sheet comprises paper coated on one surface with a color former and the second sheet comprises paper coated on one surface with a color developer, and wherein, when the carbonless paper set is assembled, the surface of the first sheet coated with the color former is in contact with the surface of a sheet coated with the color developer and the surface of the second sheet coated with the color developer is in contact with the surface of a sheet coated with the color former; (2) incorporating into the printing apparatus an ink jet ink comprising water and a colorant; (3) causing droplets of the ink containing the colorant to be ejected in an imagewise pattern onto at least one surface of the first sheet; (4) causing droplets of the ink containing the colorant to be ejected in an imagewise pattern onto at least one surface of the second sheet; (5) incorporating into the printing apparatus an ink jet ink comprising (a) water; (b) a member selected from the group consisting of glycols, sulfolane, and mixtures thereof; (c) optionally, a member selected from the group consisting of ethanol, isopropanol, n-butanol, benzyl alcohol, hexanetriol, 1,6-hexanediol, 1,5-pentanediol, 1,4-butanediol, 1,3-butanediol, and mixtures thereof; (d) diethylene glycol monobutyl ether; (e) dipropylene glycol monomethyl ether acetate; and (f) a marking material which is substantially colorless and detectable when exposed to radiation outside of a visible wavelength range; and (6) causing droplets of the ink to be ejected in an imagewise pattern onto at least one surface of at least one of the sheets of the carbonless paper set.

13. A process according to claim 10 wherein the inkjet printing process is a thermal ink jet printing process, wherein the ink is contained in nozzles which are selectively heated in an imagewise pattern, thereby causing droplets of the ink to be ejected in imagewise pattern.

* * * * *